US005757941A

United States Patent [19]

McMillen

[11] Patent Number: 5,757,941

[45] Date of Patent: May 26, 1998

[54] AUDIO SIGNAL PATCHING MIXER AND METHOD

[75] Inventor: Keith A. McMillen, Berkeley, Calif.

[73] Assignee: Gibson Guitar Corp., Nashville, Tenn.

[21] Appl. No.: 701,891

[22] Filed: Aug. 23, 1996

[51] Int. Cl.[6] .......... H04B 1/00

[52] U.S. Cl. .......... 381/119

[58] Field of Search .......... 381/119, 123, 381/120, 85, 81, 79, 77

[56] References Cited

U.S. PATENT DOCUMENTS

| | | | |
|---|---|---|---|
| 5,309,517 | 5/1994 | Barclay | 381/119 |
| 5,444,676 | 8/1995 | Balsamo et al. | 381/119 |
| 5,479,519 | 12/1995 | Davis | 381/119 |
| 5,483,528 | 1/1996 | Christensen | 381/119 |

OTHER PUBLICATIONS

Sound Sculpture "Switchblade 16", 13 pages, believed published before Aug. 23, 1995 or otherwise admitted to be prior art.

PreSonus "DCP-8", 3 pages, believed published before Aug. 23, 1995 or otherwise admitted to be prior art.

*Primary Examiner*—Curtis Kuntz
*Assistant Examiner*—Vivian Chang
*Attorney, Agent, or Firm*—McAfee & Taft

[57] ABSTRACT

Respective input electric audio signals are individually processed through respective input gain stages. Any of these processed input signals can be connected to any one or more of several outputs. Each of these inputs and outputs can be selectively adjusted. Therefore, dynamic signal processing can occur both at the input and the output, but no signal processing occurs within a switch matrix by which the input signals are selectively connected to desired outputs.

16 Claims, 3 Drawing Sheets

AUDIO SIGNAL PATCHING MIXER AND METHOD

BACKGROUND OF THE INVENTION

This invention relates to devices and methods with which multiple electric audio signals can be selectively combined and output through one or more outputs.

When recording music from a live performance in a studio and typically when putting on a live performance before an audience, electric audio signals are produced from instruments and vocals. For example, even when a soloist sings a cappella, the single voice is converted into electric audio signals via a microphone. This is typically done to generate an electric signal used to produce a recording or to broadcast an amplified reproduction of the actual sound.

When more than one voice or more than one instrument is used, there will be several independent sounds. There are times when these individual sounds, and specifically their respective electric audio signals, need to be provided to different output devices or combined in different ways. For example, when a group of musicians performs at concert, their music is typically electrically amplified and broadcast out to the audience, but it may also be desirable to broadcast it back to the musicians. This is usually done through two separate channels, each driving a respective set of speakers. As another example, sometimes individual instruments or voices need to be recorded individually or in different selected groups, such as in recording to tape or for playing through a headphone to the musician(s) or a sound engineer. Still another example is the need to individually manipulate the respective signals to control their amplitudes and tones.

A type of device known as a mixer channels respective input electric audio signals to selected outputs and provides for the selective combination of two or more of the input signals to one or more of the outputs. Although there are many types of mixers to accomplish the foregoing, there is still the need for such a mixer which integrates patchbay, mixing, and compressor/limiter/noise gating in one coherent device.

SUMMARY OF THE INVENTION

The present invention meets the aforementioned needs by providing a novel and improved electric audio signal patching mixer and method. The present invention facilitates live as well as programmable use permitting automatic signal control (e.g., the present invention does not require constant attention to prevent audio signal clipping) but also permitting rapid changes in the control if desired.

The electric audio signal patching mixer of the present invention comprises at least two input circuits and at least two output circuits. Each of the input circuits has a respective amplifier, as does each output circuit. The electric audio signal patching mixer further comprises a switch matrix which includes a number of on/off switches. The number of switches equals the product of multiplying the number of the input circuits times the number of the output circuits. The switch matrix further includes a plurality of input channels and a plurality of output channels. Each input channel is connected to a respective input circuit and to inputs of a respective group of the switches. The switches of a respective group have outputs with each output connected to a respective one of the output channels. Each of the output channels is also connected to a respective output circuit. Gain adjustment through the audio signal patching mixer occurs solely through the amplifiers of the input and output circuits.

The method of the present invention provides for patching a plurality of electric audio input signals in any combination to any of a plurality of output channels. This method comprises individually processing each of a plurality of electric audio input signals and providing the individually processed audio input signals to an on/off switch matrix. The method also comprises operating the on/off switch matrix to selectively connect or disconnect any of the individually processed audio input signals to any of a plurality of output channels whereby mixed output signals are provided with each output signal being a selected mix of the individually processed audio input signals. The method still further comprises individually processing each mixed output signal to provide individually processed audio output signals. The individual processing of each mixed output signal occurs separately from the individual processing of each audio input signal.

Therefore, from the foregoing, it is a general object of the present invention to provide a novel and improved electric audio signal patching mixer and method other and further objects, features and advantages of the present invention will be readily apparent to those skilled in the art when the following description of the preferred embodiment is read in conjunction with the accompanying drawings.

DETAILED DESCRIPTION OF PREFERRED EMBODIMENT

Figure 1:
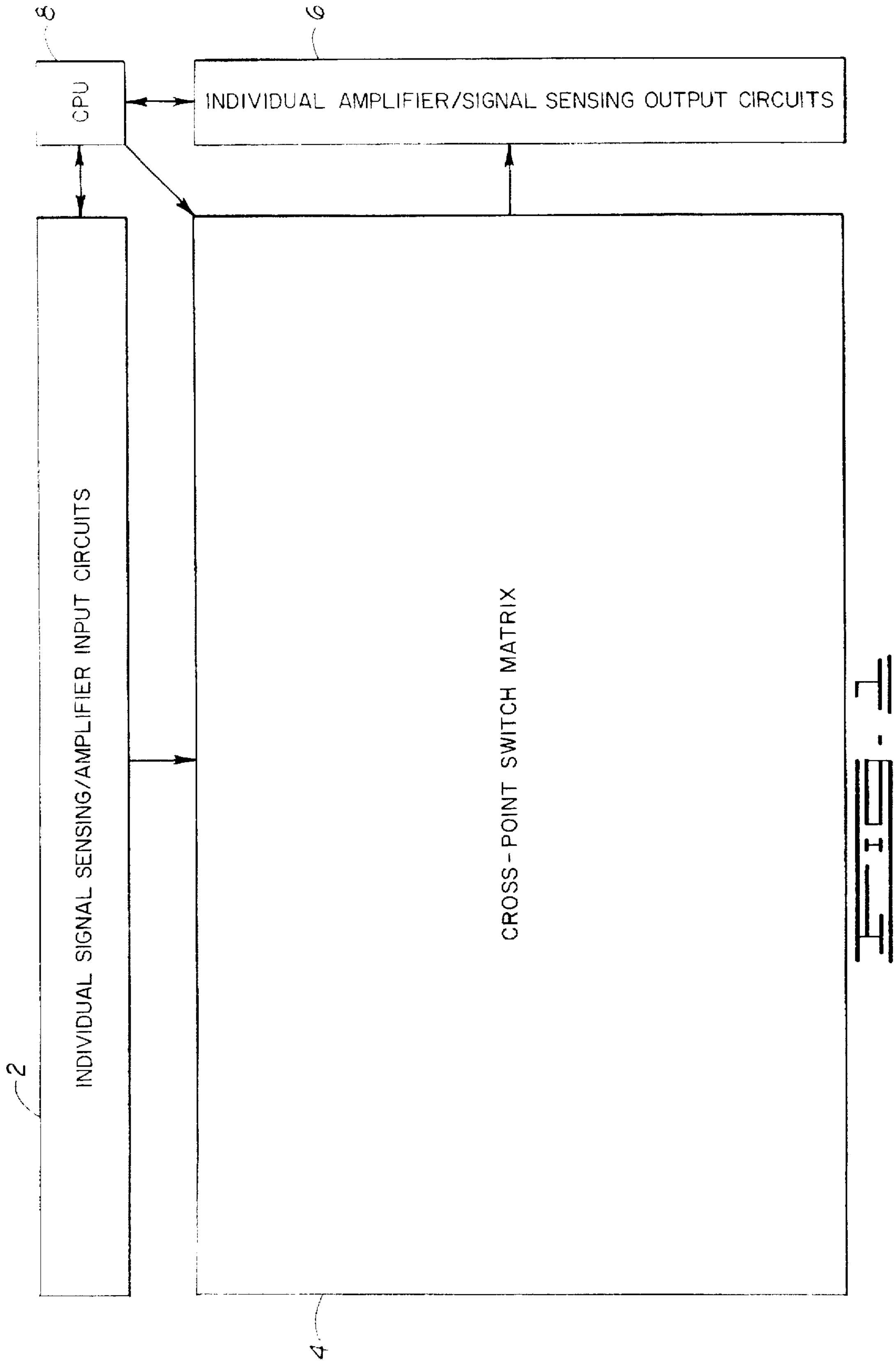
FIG. 1 is a block diagram of the preferred embodiment audio signal patching mixer of the present invention.

Referring to FIG. 1, the preferred embodiment of the electric audio signal patching mixer of the present invention includes an input section 2, a switch section 4 and an output section 6. Although these can be manually operated, they are preferably operated under control of a central processing unit (cpu) 8 which includes a microprocessor, program storage memory, working memory and related hardware and programming which are known or readily discernible to those skilled in the art given a description of the invention embodied in sections 2, 4 and 6 and an interface subsequently described with reference to FIG. 3 and connected with the cpu 8. Thus, the central processing unit 8 will not be further described other than to note that a Texas Instruments TMS370 cpu is one example of a specific implementation for the cpu 8.

Figure 2:
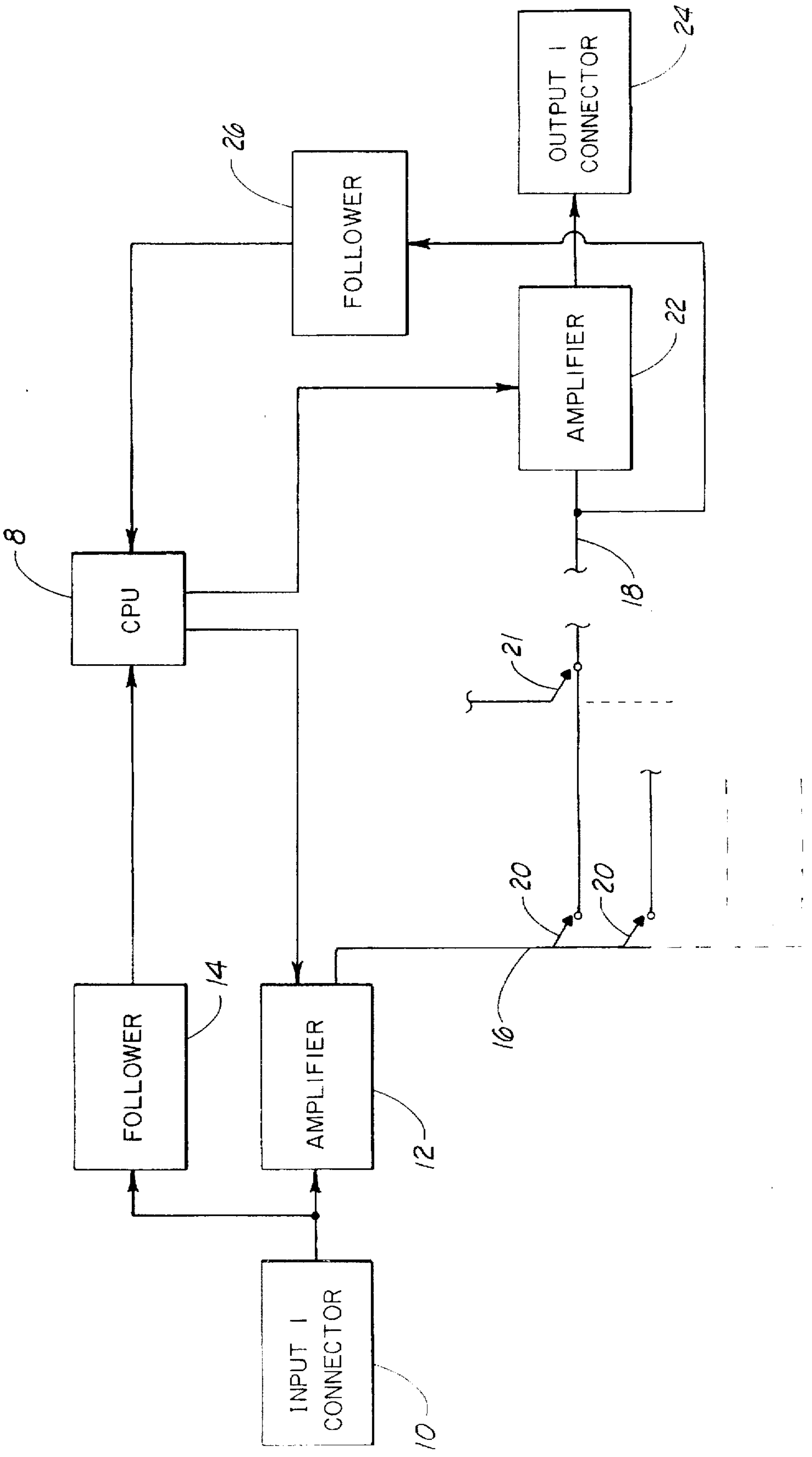
FIG. 2 is a block diagram showing more detail of one input circuit, one output circuit and parts of input and output channels and switches of the switch matrix of the embodiment shown in FIG. 1.

As indicated in FIG. 1, the input section 2 includes the individual signal sensing and amplifier input circuits of the preferred embodiment. One of these circuits is illustrated in FIG. 2. It includes an input connector 10, such as a conventional audio jack. The input connector 10 is connected to the input of an amplifier 12, which in the preferred embodiment is a voltage controlled amplifier such as a CS3310 digitally controlled amplifier (as used herein the term "voltage controlled amplifier" includes digitally controlled amplifiers although a conventional VCA may imply only analog voltage control). The output of the amplifier 12 is provided to an input channel of the switch section 4, which will be more fully described below.

The input connector is also connected to the input of a signal sensing or following circuit, referred to herein as an envelope follower 14, which functions in a known manner to track the input signal and provide a responsive signal to the cpu 8 for dynamic signal processing (e.g., to prevent clipping if the input exceeds a preset level which would cause distortion in the output signal and to reduce or prevent noise). In the preferred embodiment, the output of the envelope follower 14 goes to the central processing unit 8 which then adjusts its digital voltage control signal to the amplifier 12. A particular implementation of the follower 14 in conjunction with the cpu 8 is as a digitally controlled analog dynamics processor (a device exemplifying desired functions is the DC-8 from preSonus Audio Electronics).

The input circuit also preferably includes suitable signal buffering of known type at the inputs of the amplifier 12 and the follower 14.

Each input circuit of the input section 2 has the same configuration as that just described and shown in FIG. 2. In a specific implementation, there are sixteen such input circuits so that up to sixteen different electric audio signals can be input to the specific implementation.

Each input circuit, and specifically the output of the respective amplifier thereof, is connected to commonly connected inputs of a respective one of sixteen groups of sixteen switches in the particular implementation of the preferred embodiment of the switch matrix 4. The switch matrix 4 is specifically a cross-point switch matrix providing at least as many switches as the product of the number of input circuits multiplied times the number of output circuits of the output section 6. A specific implementation is an Analog Device AD75019 crosspoint switch matrix.

Each switch of the switch matrix 4 is at the node of a respective input channel and a respective output channel of the switch matrix. Referring to FIG. 2, an input channel of the switch matrix 4 is identified by the reference numeral 16, and an output channel is identified by the reference numeral 18. The input channel 16 is shown connected to the output of the amplifier 12. For a sixteen input and sixteen output switch matrix, there are fifteen other input channels 16, each dedicated to a respective amplifier 12 of a respective input circuit of the input section 2.

Each input channel 16 connects to commonly connected inputs of switches 20 represented in FIG. 2. For each input channel 16, there are a number of switches 20 equal to the number of output circuits there are in the output section 6. In the aforementioned particular implementation, there are sixteen switches 20 for each input channel 16.

The switches 20 are illustrated in FIG. 2 in a mechanical embodiment wherein the respective poles are connected in common with the input channel 16. It is to be noted, however, that it is preferred that the switches 20 be electrically implemented, such as with microcircuit transistors controlled by the central processing unit 8 in either an on condition (i.e., switch closed position) or off condition (i.e., switch open position). In this way the switch matrix 4 merely either passes the input signal to the respective output (during the switch on or closed condition) or prevents it from passing to the output (when the switch is in the off or open condition). There is no signal processing within the switch matrix 4.

From FIG. 2 it will be further noted that the output of each switch 20 is connected in common with other switches of the same output channel 18. One example of this is shown by switch 21 in FIG. 2.

Each output channel 18 of the switch matrix 4 is connected to a respective output circuit of the output section 6. Each output circuit is preferably constructed the same as each input circuit. Thus, each output circuit includes an amplifier 22, preferably a voltage controlled amplifier (e.g., of the same type as amplifiers 12) controlled by the cpu 8. Each amplifier 22 has its input connected to a respective output channel 18 of the switch matrix 4. Each amplifier 22 also has an output connected to a respective output connector 24, such as an output jack. The input to the amplifier 22 is also provided to a respective signal sensing circuit, such as an envelope follower 26, which functions the same as the follower 14 (e.g., of the same type as limiters 14) but with regard to the signal coming into the amplifier 22. As with the follower 14, the follower 26 actually provides its control via the cpu 8 which responds to the output of the follower 26 in generating its digital voltage control signal to the amplifier 22. Thus, each amplifier 22 is connected to one respective set of commonly connected outputs of the corresponding switches of the total number of groups of switches within the switch matrix 4.

Figure 3A:
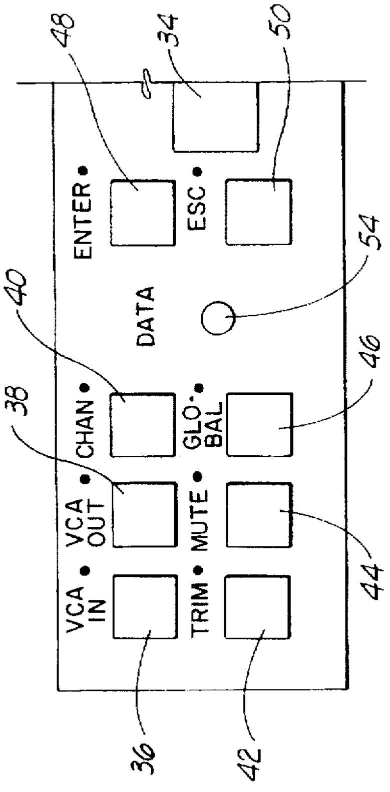
FIGS. 3A and 3B are a view of a front panel providing a human interface for an operator of the audio signal patching mixer of the preferred embodiment of the present invention.
Figure 3B:
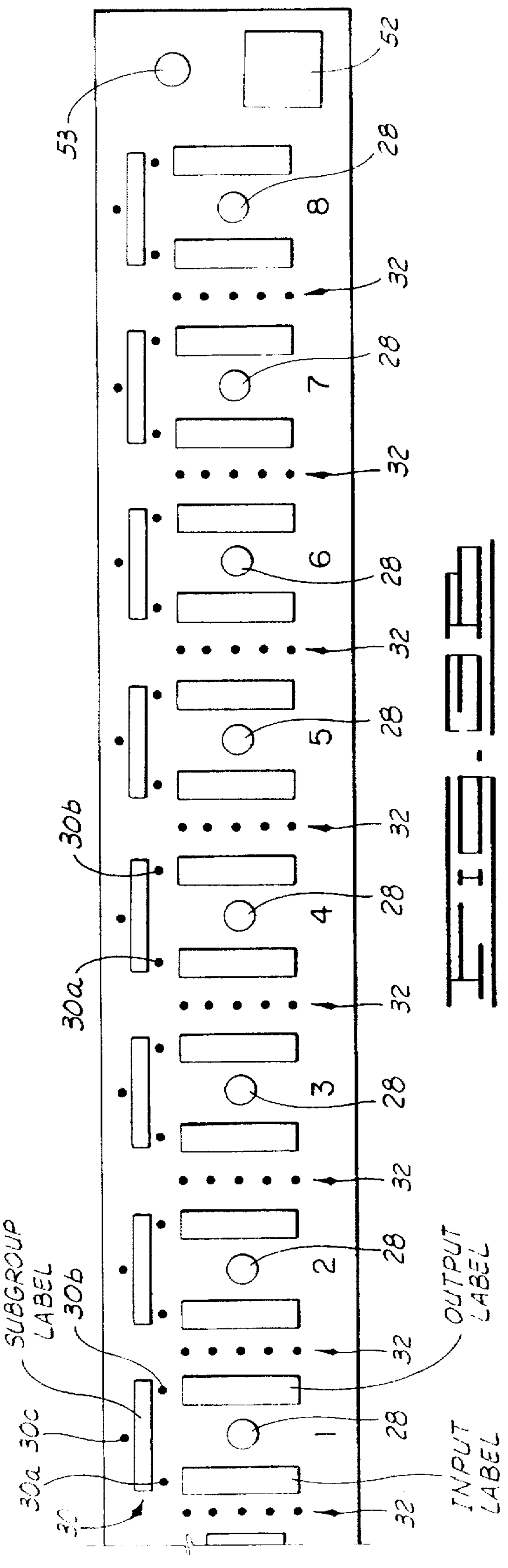

Although the input section 2, switch matrix 4 and output section 6 are, in the preferred embodiment, controlled under operation of the cpu 8, external control by an operator of the present invention can be provided via the interface having a particular implementation shown in FIG. 3. This interface includes rotary gain adjustment knobs 28 which also function to select input/output connections. In the illustrated particular implementation of the preferred embodiment, there are one-half the number of knobs 28 as there are input and output circuits (assuming an equal number of input and output circuits) which facilitates use of the implementation with stereo inputs (i.e., each pair of inputs is associated with a pair of input circuits for a respective control 28), but which also allows two independent inputs to be commonly controlled through a single control 28. The same applies to the output circuits. Thus, in the particular implementation there are eight gain adjustment controls 28. Each of these is operable to adjust the gain of two respective input circuits and two respective output circuits. Which circuit is being set is indicated by labeled light-emitting diodes as shown at 30 in FIG. 3. A label is attached to the front panel below each input channel LED 30*a*, and a label is attached to the front panel below each output channel LED 30*b*. Associated with each knob 28 is a light-emitting diode ladder 32 which gives a relative indication of the gain adjustment. The actual adjustment is shown in a two line by sixteen character liquid crystal display 34.

The interface shown in FIG. 3 also includes eight function switches having corresponding light-emitting diodes to indicate the state of the respective switch. These switches include VCA IN switch 36 and VCA OUT switch 38 which designate whether the respective control knob 28 is adjusting the gain of an input amplifier 12 (VCA IN selection) or an output amplifier 22 (VCA OUT selection). A channel selector switch is used in making switch assignments for desired input/output connections. These switches, as well as the other interface controls, can have additional or different functions based on specific programming of the cpu 8.

The function switches also include a trim switch 42, a mute switch 44, a global switch 46, an enter switch 48 and an escape switch 50. These will be further described below.

Also included in the interface shown in FIG. 3 is a power on/off switch 52, and a rotary encoder 54 used to enter or change values or information via the user interface.

A more detailed functional description of the particular implementation of the preferred embodiment will next be given.

Signal Flow

Each electric audio signal input (−10 dB 10 KΩ) is buffered and passes through a high quality digital gain control device, namely a respective voltage controlled amplifier (VCA, but preferably specifically a digitally controlled amplifier as explained above) 12. This control provides attenuation and gain over a 127 dB (−96 dB to +31 dB) range in 0.5 dB increments. Intelligent zero crossing detection allows changes in gain only at a signal's zero crossing, thereby eliminating any residue of zipper noise.

From the amplifier 12, the gain adjusted signal enters a 16×16 matrix crosspoint switch which allows the signal to be routed to any, none, or all of the outputs. These routing setups are stored by the cpu 8 for each of up to 127 presets. Each preset is a respective stored set of input/output links along with associated gain and other desired parameters. One example of entering a preset is to press the global switch 46, turn the rotary encoder 54 until a matrix setup page of the programming of the cpu 8 appears in the display 34, press VCA IN switch 36, turn the encoder(s) 28 for the selected input circuit(s), press enter switch 48, press VCA OUT switch 38, turn the encoder(s) 28 for the selected output circuit(s) to be linked to the selected input(s), and press enter switch 48. Entered with the input/output circuit linkage data will be any desired gain settings and other parameters. Such gain settings are as described below. Other parameter settings are made by selecting from stored option tables in the programming of the cpu 8; such selecting occurs in one embodiment by using the global switch 46, the data encoder 54, the display 34, and the enter switch 48 (e.g., a preloaded menu containing settings for a respective follower 14 is called up to the display using the global switch 46 and the encoder 54, and a selection is made using the encoder 54 and the enter switch 48).

Selected input signals are summed at selected outputs. The summed signal then passes through the respective output amplifier 22 to the respective rear panel connector 24.

Envelope Follower

At each of the inputs and outputs, an accurate envelope follower 14 (input), 26 (output) converts the audio into a control signal that is read by the cpu 8. The functions implemented through the followers 14, 26 and cpu 8 are based upon settings determined by the user and stored in memory with other preset information as explained above. Each of the inputs and outputs can be separately configured. Configuration options include threshold, gain amount, attack and decay times. Several response curves and "knees" can be used. Input/output pairs can be linked to preserve a stereo image. Links between other inputs and outputs can be made to allow effects such as ducking or speaker source enhancement. All links are storable in the cpu.

The signal strength sensed by the envelope follower for each of the inputs and outputs can be displayed on the front panel via the LED ladders 32 and the display 34 and also sent via MIDI for remote monitoring or display.

User Interface and Front Panel Controls

Control Description

Front panel controls include the eight channel rotary encoders 28, LED ladders 32 and status LEDs 30 designed to facilitate both programming and real time use. The editing section includes 2 line by 16 character liquid crystal display 34, the data knob 54 and eight function switches with LEDs. These are VCA IN, VCA OUT, CHAN, Mute, Global, Trim, Enter and Escape referred to above.

There is also the front panel power switch 52 and headphone jack 53.

The status LEDs 30 are arranged above each of the channel rotary encoders 28 in a triangular pattern as shown in FIG. 3 (other arrangements can be used, including different numbers of status LEDs, such as only two with four indicator conditions possible as designated by either of the two on, both off or both on).

Input and Output Level Adjustment

To set an input gain level press the "VCA IN" switch 36. The lower left status LEDs **30*a* will light. As an encoder 28 is rotated, the respective LED ladder 32 will illuminate to show relative level setting and the actual level setting in dB will be shown in the display 34**.

To set an output gain level press the "VCA OUT" switch 38. The lower right status LEDs **30*b* will light. As an encoder 28 is rotated, the respective LED ladder 32 will illuminate to show relative level setting and the actual level setting in dB will be shown in the display 34**.

Channel Selection

Each channel rotary encoder 28 can adjust the amplifiers 12 of two input circuits and the amplifiers 22 of two output circuits. One implementation may have two modes of operation: one in which the rotary encoder adjusts both amplifiers (i.e., either both input or both output amplifiers) in common, and one in which independent control can be made. In whichever mode is selected, one technique for defining input/output channel links is to press VCA IN switch 36 and channel switch 40 to commence input circuit selection for a particular link. This activates the encoders 28 to designate selected inputs when a respective encoder 28 is rotated. In the same manner, one or more linked outputs are selected by the respective rotary encoders 28 following activation of the VCA OUT and channel switches 38, 40. The method can be implemented with activations of the enter switch 48 as desired (e.g., after each selected encoder is rotated or at the end of a VCA IN/CHAN or VCA OUT/CHAN sequence). This can be used in establishing presets.

To recall such a preset, the global switch 46 and the data encoder 54 can be used to enter identifying data by which the cpu 8 calls up the preset information. This can be alphanumeric encoding such that the preset can be stored and recalled under alphabetic or numeric labels for easy recall by a user.

Sub-Grouping

It is often desirable, especially in live performance, to be able to change settings for a group of levels. This is done by assigning a group of inputs or outputs to one of the channel rotary encoders 28. The center upper status LED **30*c*** with an adhesive label is used for naming the Sub-Group (i.e., an identifier can be written on the label so that the sub-group assigned to that encoder can be quickly identified).

Assigning a group of inputs with one or more outputs in a sub-group combination allows common control to be applied quickly to all channels of the sub-group. For example, if a number of inputs were simply linked either individually or collectively to one or more outputs as a preset of the type described above, then each preset would need to be called up for a change to be made. With sub-grouping, however, the grouping is immediately accessible by simply entering sub-group mode and then controlling gain in common through the encoder 28 to which the sub-group has been assigned (in one embodiment, the unit comes up in sub-group mode, in another it could be entered such as by pressing both VCA IN and VCA OUT in).

Thus, sub-grouping is distinguishable from the presetting previously described.

To make an assignment of a desired sub-group to a respective encoder 28 in a particular implementation, press the global function switch 46 and select a sub-group page in the display 34 using the data knob 54. The sub-group status LEDs 30*c* will flash. Move the channel rotary encoder 28 for the desired sub-group location. The selected sub-group status LED 30*c* will stay on and the others will stop. Then press either the VCA IN or VCA OUT function switch. The appropriate In/Out status LEDs 30*a*, 30*b* will flash. Move the channel rotary encoder 28 for each of the channels to be controlled by the sub-group. Sub-groups can include both Ins and Outs. If desired, entries can be made by pressing the enter switch 48 for each encoder moved or after all the selected inputs or outputs have been selected. The technique can also be defined to allow different sets of input/output links to be grouped as a sub-group.

Trim

As nice as programmability can be, often last minute changes need to be accommodated. This can be due to replacement of an instrument that has a different output level or a particularly dry room that demands more reverb. The Trim function, via switch 42, allows an offset in level to globally multiply the levels stored in all 127 presets.

Mute

Sometimes it may be necessary to make big changes quickly pressing the Mute function switch 44 once turns off all Input and Output levels. Pressing it again returns the levels to their last preset plus any changes made by Sub-Group commands or over MIDI. Holding the Mute function switch for three seconds restores the levels to the Preset settings without including any performance level shifts.

Solo

From Global enter the Solo Page using the data knob 54. Select the "VCA IN" function and move the desired channel rotary encoder 28. All other channels will be muted and this input will be routed to stereo output eight and the headphone jack at 0 dB. Further adjustments will change the gain in a normal manner.

Data

The rotary encoder 54 is used to enter or change values for the parameters used by the cpu 8 in conjunction with the followers and amplifiers of the input and output circuits.

Enter

The enter switch 48 makes the cpu 8 accept data and/or moves down a user interface tree displayed through the display 34.

Esc

The escape (ESC) switch 50 cancels data entry and moves up the user interface tree.

The above-described specific implementation has the following features:

- mix and patch up to eight stereo sources with up to eight stereo destinations (or up to sixteen individual inputs and up to sixteen individual outputs)
- any input can be routed to any or all outputs
- inputs and outputs adjustable over a 127 dB range (−96 dB to +31 dB)
- 127 presets store all level and patch routing information
- dynamic signal processing for each input and output
- MIDI control of all functions
- front panel makes programming easy and provides fast real time control
- signal/noise ratio >100 dB; distortion <0.02%; 15 hz to 80 Khz +/−0.5 dB
- dynamic signal processing programmable for each channel, can be linked or defeated

- subgrouping of inputs and outputs allow simple front panel control
- stereo input #8 can accept two differential microphone inputs (TRS)
- stereo output #8 can drive a +4 differential line (TRS)
- can be implemented for full remote operation
- footpedal jack can be used for assignable volume control or patch change The foregoing examples of functional implementations should not be taken as limiting of the invention because various manual and remote data input devices and techniques can be used to accomplish the functional aspects of the present invention. For example, the sub-grouping feature is not limited to any specific implementation other than with regard to its aspect of assigning a sub-group to a readily accessible control device that can be quickly accessed and operated during a live performance to adjust some parameter, such as gain, of the entire sub-group.

From the foregoing, it is apparent that the present invention also provides a method of patching a plurality of electric audio input signals in any combination to any of a plurality of outputs. This includes individually processing each of a plurality of electric audio input signals and providing the individually processed audio input signals to an on/off switch matrix. This occurs through each of the input circuits of the input section 2 shown in FIGS. 1 and 2.

The method further includes operating the on/off switch matrix to selectively connect or disconnect any of the individually processed audio input signals to any of a plurality of output channels whereby mixed output signals are provided with each output signal being a selected mix of the individually processed audio input signals. Although in the preferred embodiment this occurs under control of the cpu 8 as programmed in accordance with the foregoing functional description, the present invention can also be implemented manually whereby the switch matrix is manually operated to set the switches to achieve the desired input signal mixing and connection thereof to the desired output.

The method of the present invention further includes individually processing each mixed output signal to provide individually processed audio output signals. This occurs through the output circuits of the output section 6, which is separate from the individual processing of each audio input signal.

It is to be noted that in the present invention all signal processing occurs only with regard to a respective input signal and/or a desired output signal, all of which occurs outside the switch matrix 4. Thus, this results in a reduced number of amplifiers and limiters being needed as compared to a system which performs the signal processing at each node within the switch matrix of such other implementations.

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

What is claimed is:

1. An electric audio signal patching mixer, comprising:

at least two input circuits, each of said input circuits having a respective amplifier;

at least two output circuits, each of said output circuits having a respective amplifier; and a switch matrix including a number of on/off switches equal to the product of multiplying the number of said input circuits times the number of said output circuits, said switch matrix further including a plurality of input channels and a plurality of output channels wherein each input channel is connected to a respective input circuit and to inputs of a respective group of said switches having outputs each connected to a respective one of said output channels, each of said output channels also connected to a respective output circuit, whereby gain adjustment through said audio signal patching mixer occurs solely through said amplifiers of said input and output circuits.

2. An electric audio signal patching mixer as defined in claim 1, further comprising a respective envelope follower in each of said input and output circuits and connected to the respective said amplifier thereof.

3. An electric audio signal patching mixer as defined in claim 1, further comprising a plurality of external gain adjustment members equal in number to one-half the number of said input circuits, each of said gain adjustment members connected for providing gain adjustment signals for a respective two input circuits and a respective two output circuits.

4. An electric audio signal patching mixer, comprising:

sixteen audio signal input connectors;

a first plurality of sixteen voltage controlled amplifiers, each amplifier of said first plurality connected to a respective one of said audio signal input connectors;

sixteen groups of sixteen switches, each of the sixteen switches in each said group having an input connected to the input of each other switch within the respective group and each of the sixteen switches in each said group having an output connected to the output of a corresponding switch in each of the other groups of switches, each said switch operable in only one of two states, wherein in one state the respective input and output are connected such that an audio signal at the respective input is provided at the respective output without significant modification thereto, and wherein in the other state the respective input and output are disconnected such that an audio signal at the respective input is not provided at the respective output;

sixteen audio signal output connectors;

a second plurality of sixteen voltage controlled amplifiers, each amplifier of said second plurality connected to a respective one of said audio signal output connectors;

wherein each amplifier of said first plurality is connected to the commonly connected inputs of a respective one of said sixteen groups of sixteen switches; and wherein each amplifier of said second plurality is connected to one respective set of commonly connected outputs of the corresponding switches of all sixteen groups of sixteen switches.

5. An electric audio signal patching mixer as defined in claim 4, further comprising:

a first plurality of sixteen signal followers, each of said followers of said first plurality connected to a respective one of said first plurality of sixteen voltage controlled amplifiers; and a second plurality of sixteen signal followers, each of said followers of said second plurality connected to a respective one of said second plurality of sixteen voltage controlled amplifiers.

6. An electric audio signal patching mixer as defined in claim 4, further comprising eight external gain adjustment members, through any one of which gain adjustment members an operator of said mixer adjusts gain of a respective two voltage controlled amplifiers of said first plurality of amplifiers and a respective two voltage controlled amplifiers of said second plurality of amplifiers.

7. A method of patching a plurality of electric audio input signals in any combination to any of a plurality of outputs, comprising:

individually processing each of a plurality of electric audio input signals and providing the individually processed audio input signals to an on/off switch matrix;

operating the on/off switch matrix to selectively connect or disconnect any of the individually processed audio input signals to any of a plurality of output channels whereby mixed output signals are provided with each output signal being a selected mix of the individually processed audio input signals; and individually processing, separately from the individual processing of each audio input signal, each mixed output signal to provide individually processed audio output signals.

8. A method as defined in claim 7, wherein:

individually processing each of a plurality of audio input signals includes adjusting the amplitude of a respective input signal outside of the switch matrix; and individually processing each mixed audio output signal includes adjusting the amplitude of a respective output signal outside of the switch matrix.

9. A method of rapidly and simultaneously changing a sound-affecting parameter of a patching mixer during a live performance of instruments connected to the patching mixer, which patching mixer includes a plurality of input circuits to which the instruments are connected, a plurality of output circuits, a switch matrix connected to the input and output circuits, and an interface having a plurality of controls connected to manipulate the sound-affecting parameter for specific ones of the input and output circuits fixed to the respective control, said method comprising:

while maintaining the fixed association of input and output circuits with respective controls of the interface of the patching mixer, operating the interface to create one or more selected sub-groups of input and output circuits and switch matrix combinations and to assign a created sub-group to a respective one of the controls; and during a live performance of instruments connected to input circuits of the patching mixer, operating the control for a respective sub-group to change the sound-affecting parameter for the entire respective sub-group assigned to that respective control.

10. A method as defined in claim 9, wherein each sub-group is assigned to a respective gain adjustment encoder of the interface.

11. A method as defined in claim 9, further comprising writing an identifier on a label connected to the interface of the patching mixer adjacent the respective control, wherein the identifier designates the sub-group assigned to the respective control and further wherein the identifier can be changed.

12. An electric audio signal patching mixer, comprising one coherent device integrating patchbay and mixing, said device including:

at least two input circuits, each of said input circuits including a respective input audio jack and a respective input amplifier connected to said respective input audio jack;

at least two output circuits, each of said output circuits including a respective output amplifier and a respective output audio jack connected to said respective output amplifier; and a switch matrix including a number of on/off switches equal to at least the product of multiplying the number of said input circuits times the number of said output circuits, said switch matrix further including a plurality of input channels and a plurality of output channels wherein each input channel is connected to a respective input circuit and to inputs of a respective group of said switches having outputs each connected to a respective one of said output channels, each of said output channels also connected to a respective output circuit, such that any said input circuit can be connected to any said output circuit simultaneously with any one or more other said input circuits and such that gain adjustment through said audio signal patching mixer occurs through said input and output amplifiers of said input and output circuits outside said switch matrix.

13. An electric audio signal patching mixer as defined in claim 12, wherein:

each said input circuit further includes a respective input envelope follower having an input connected to said input audio jack of the respective said input circuit and having an output connected to provide control for said input amplifier of the respective said input circuit; and each said output circuit further includes a respective output envelope follower having an input connected to said output amplifier of the respective said output circuit and having an output connected to provide control for said output amplifier of the respective said output circuit.

14. An electric audio signal patching mixer as defined in claim 13, wherein:

each said input amplifier is a respective voltage controlled amplifier;

each said output amplifier is a respective voltage controlled amplifier; and said one coherent device further includes a central processing unit connected to receive the output of each said input envelope follower and to provide a respective control signal to each respective said input amplifier voltage controlled amplifier, said central processing unit also connected to receive the output of each said output envelope follower and to provide a respective control signal to each respective said output amplifier voltage controlled amplifier.

15. An electric audio signal patching mixer as defined in claim 14, wherein each said input envelope follower and each said output envelope follower includes a respective analog dynamics processor.

16. An electric audio signal patching mixer as defined in claim 13, wherein each said input envelope follower and each said output envelope follower includes a respective analog dynamics processor.

* * * * *

UNITED STATES PATENT AND TRADEMARK OFFICE
CERTIFICATE OF CORRECTION

Patent No.: 5,757,941

Dated: May 26, 1998

Inventor: Keith A. McMillen

It is certified that errors appear in the above-identified patent and that said Letters Patent is hereby corrected as shown below (line numbers are numbers of actual typed lines):

Column 2, line 20, insert --.-- after "method".

Column 2, line 20, change "other" to --Other--.

Column 3, line 14, change "DC-8" to --DCP-8--.

Column 3, line 14, change "preSonus" to --PreSonus--.

Column 6, line 66, delete the paragraph break so that lines 46-67 are one continuous paragraph.

Column 7, line 26, insert --.-- after "quickly".

Column 7, line 26, change "pressing" to --Pressing--.

Signed and Sealed this

Second Day of March, 1999

Attest:

Q. TODD DICKINSON

*Attesting Officer*

*Acting Commissioner of Patents and Trademarks*